(12) United States Patent
Hughes

(10) Patent No.: US 8,793,924 B2
(45) Date of Patent: Aug. 5, 2014

(54) CRAWFISH FISHING LURE

(75) Inventor: Timothy Richard Hughes, Reeds Spring, MO (US)

(73) Assignee: Bass Pro Intellectual Property, L.L.C., Springfield, MO (US)

(*) Notice: Subject to any disclaimer, the term of this patent is extended or adjusted under 35 U.S.C. 154(b) by 534 days.

(21) Appl. No.: 12/914,527

(22) Filed: Oct. 28, 2010

(65) Prior Publication Data

US 2012/0102815 A1  May 3, 2012

(51) Int. Cl.
*A01K 85/18* (2006.01)
*A01K 85/00* (2006.01)

(52) U.S. Cl.
USPC ....... 43/42.15; 43/42.24; 43/42.26; 43/42.36; 43/42.02

(58) Field of Classification Search
USPC ............ 43/42.24, 42.26, 42.28, 42.36, 42.15, 43/42.02, 42.47, 42.09
See application file for complete search history.

(56) References Cited

U.S. PATENT DOCUMENTS

| | | | | |
|---|---|---|---|---|
| 208,581 A | * | 10/1878 | Falvey | 43/42.26 |
| 803,134 A | * | 10/1905 | Rhodes | 43/42.02 |
| 879,869 A | * | 2/1908 | Hansen | 43/42.36 |
| 941,911 A | * | 11/1909 | Burthe | 43/42.02 |
| 1,109,439 A | * | 9/1914 | Maus | 43/42.15 |
| 1,247,955 A | * | 11/1917 | Grube | 43/42.26 |
| 1,393,617 A | * | 10/1921 | Frame | 43/42.02 |
| 1,689,541 A | * | 10/1928 | Welch | 43/42.36 |
| 1,792,366 A | * | 2/1931 | Ettles | 43/42.15 |
| 1,813,722 A | * | 7/1931 | Wright et al. | 43/42.36 |
| 1,849,434 A | * | 3/1932 | Page | 43/42.02 |
| 1,888,221 A | * | 11/1932 | Coffin | 43/42.02 |
| 1,908,537 A | * | 5/1933 | Pflueger | 43/42.26 |
| 1,928,418 A | * | 9/1933 | Garland | 446/158 |
| 1,976,695 A | * | 10/1934 | Boehm | 43/42.26 |
| 2,025,270 A | * | 12/1935 | Chaney | 43/42.15 |
| 2,089,605 A | * | 8/1937 | Hardy | 43/42.26 |
| 2,209,161 A | * | 7/1940 | Gunderson | 43/42.02 |
| 2,217,677 A | * | 10/1940 | George | 43/42.02 |
| 2,218,280 A | * | 10/1940 | Deering | 43/42.26 |
| 2,221,381 A | * | 11/1940 | Hosmer | 43/42.02 |
| 2,290,433 A | * | 7/1942 | Jeffers | 43/42.26 |
| 2,593,461 A | * | 4/1952 | Jones | 43/42.02 |

(Continued)

FOREIGN PATENT DOCUMENTS

| | | |
|---|---|---|
| CN | 2875059 Y | 3/2007 |
| DE | 202010007096 U1 | 9/2010 |

(Continued)

OTHER PUBLICATIONS

Office Action issued for Chinese Patent Application No. 201110232163.9, dated Jul. 5, 2013.

*Primary Examiner* — Darren W Ark
(74) *Attorney, Agent, or Firm* — Pillsbury Winthrop Shaw Pittman LLP

(57) ABSTRACT

A fishing lure includes a body resembling the shape of a crawfish. The fishing lure includes a wire material and a flexible material connecting portions of a tail of the lure, and a passage through the body of the lure for receiving a fishing line such that an upward pulling of the fishing line passing through the passage causes a relative movement the portions of the tail in the downward action, and wherein the wire material operates to return the portions of the tail to their original position to generate a backwards movement of the lure.

31 Claims, 7 Drawing Sheets

(56) References Cited

U.S. PATENT DOCUMENTS

| | | | | |
|---|---|---|---|---|
| 2,597,792 | A * | 5/1952 | Hardy | 43/42.36 |
| 2,598,771 | A * | 6/1952 | Eder | 43/42.47 |
| 2,663,964 | A * | 12/1953 | Martin | 43/42.02 |
| 2,690,026 | A * | 9/1954 | King | 43/42.02 |
| 2,718,668 | A * | 9/1955 | Burke | 43/42.24 |
| 2,724,205 | A * | 11/1955 | Howard | 43/42.02 |
| 2,770,063 | A * | 11/1956 | Martin | 43/42.02 |
| 2,787,076 | A * | 4/1957 | Kring | 43/42.36 |
| 2,791,859 | A * | 5/1957 | Wentworth | 43/42.02 |
| 2,793,460 | A * | 5/1957 | Mutchler | 43/42.26 |
| 2,819,553 | A * | 1/1958 | Fultz | 43/42.26 |
| 2,851,814 | A * | 9/1958 | Lutz | 43/42.15 |
| 2,910,799 | A * | 11/1959 | Wentworth | 43/42.02 |
| 3,068,604 | A * | 12/1962 | Nyberg | 43/42.24 |
| 3,105,317 | A * | 10/1963 | Fox | 43/42.26 |
| 3,376,663 | A * | 4/1968 | Amrine | 43/42.02 |
| 3,377,734 | A * | 4/1968 | Snow | 43/42.24 |
| 3,389,490 | A * | 6/1968 | Peters et al. | 43/42.36 |
| 3,438,144 | A * | 4/1969 | Lincoln | 43/42.15 |
| 3,537,207 | A * | 11/1970 | McClellan et al. | 43/42.15 |
| 3,543,430 | A * | 12/1970 | Brokaw | 43/42.02 |
| 3,735,518 | A * | 5/1973 | Kleine et al. | 43/42.15 |
| 3,740,891 | A * | 6/1973 | Rubenstein | 43/42.02 |
| 3,753,310 | A * | 8/1973 | Werner | 43/42.47 |
| 3,971,152 | A * | 7/1976 | Husson, Jr. | 43/42.28 |
| 4,771,567 | A * | 9/1988 | Cannon | 43/42.26 |
| 4,862,630 | A * | 9/1989 | Welch | 43/42.26 |
| 4,870,775 | A * | 10/1989 | Schrader | 43/42.02 |
| 5,088,227 | A * | 2/1992 | Toner et al. | 43/42.02 |
| 5,170,579 | A | 12/1992 | Hollinger | |
| 5,182,875 | A | 2/1993 | Righetti | |
| 5,203,103 | A * | 4/1993 | Hawley | 43/42.24 |
| 5,209,007 | A * | 5/1993 | Southerland, Jr. | 43/42.09 |
| 5,406,738 | A | 4/1995 | Holleman, Sr. | |
| 5,438,790 | A * | 8/1995 | Rigney | 43/42.24 |
| D363,527 | S | 10/1995 | Alexander | |
| 5,490,347 | A * | 2/1996 | Conley | 43/42.47 |
| 5,630,289 | A * | 5/1997 | Dotson | 43/42.28 |
| 5,787,634 | A * | 8/1998 | Way | 43/42.15 |
| 5,829,183 | A * | 11/1998 | Guerin | 43/42.02 |
| 5,915,944 | A * | 6/1999 | Strunk | 43/42.26 |
| D417,901 | S * | 12/1999 | Poppell | D22/132 |
| 6,195,930 | B1 * | 3/2001 | Sato | 43/42.28 |
| 6,212,818 | B1 * | 4/2001 | Huddleston | 43/42.15 |
| 6,226,918 | B1 * | 5/2001 | Rigney | 43/42.24 |
| 6,453,599 | B2 * | 9/2002 | Mathews et al. | 43/42.02 |
| D465,544 | S * | 11/2002 | Brinkman | D22/132 |
| 6,505,432 | B2 * | 1/2003 | Brinkman | 43/42.02 |
| 6,546,663 | B1 * | 4/2003 | Signitzer et al. | 43/42.02 |
| 6,857,220 | B2 | 2/2005 | King | |
| 6,865,842 | B2 * | 3/2005 | Brinkman | 43/42.02 |
| 6,910,295 | B2 * | 6/2005 | Nakahashi | 43/42.15 |
| 6,912,808 | B1 * | 7/2005 | Mak | 43/42.15 |
| 7,168,203 | B2 | 1/2007 | Chambers, Sr. | |
| 7,493,725 | B2 * | 2/2009 | Sampson | 43/42.36 |
| 7,497,045 | B1 * | 3/2009 | Crowe et al. | 43/42.39 |
| 7,559,172 | B2 * | 7/2009 | Hogan | 43/42.24 |
| 7,793,457 | B2 * | 9/2010 | Hogan | 43/42.24 |
| 7,895,789 | B2 * | 3/2011 | Langer | 43/42.15 |
| 7,954,274 | B2 * | 6/2011 | MacDonald | 43/42.36 |
| 8,230,639 | B2 * | 7/2012 | Langer et al. | 43/42.15 |
| 2001/0047609 | A1 * | 12/2001 | Orgeron et al. | 43/42.31 |
| 2005/0126066 | A1 | 6/2005 | King | |
| 2005/0172538 | A1 * | 8/2005 | Brinkman | 43/42.36 |
| 2005/0193620 | A1 | 9/2005 | King | |
| 2005/0217166 | A1 * | 10/2005 | MacDonald | 43/42.36 |
| 2006/0236588 | A1 * | 10/2006 | Rapelje | 43/42.24 |
| 2006/0260176 | A1 * | 11/2006 | Yeung | 43/42.15 |
| 2009/0307959 | A1 * | 12/2009 | Hughes | 43/42.15 |
| 2010/0011651 | A1 * | 1/2010 | Rapelje | 43/42.28 |
| 2010/0071252 | A1 | 3/2010 | Woodley | |
| 2010/0146837 | A1 * | 6/2010 | Zernov | 43/42.15 |
| 2010/0287812 | A2 * | 11/2010 | Hughes | 43/42.15 |
| 2012/0167447 | A1 * | 7/2012 | Blanchar | 43/42.09 |

FOREIGN PATENT DOCUMENTS

| | | | | |
|---|---|---|---|---|
| EP | 1763996 | A1 * | 3/2007 | A01K 85/18 |
| JP | 01132325 | A * | 5/1989 | A01K 85/00 |
| JP | 10248439 | A * | 9/1998 | A01K 85/00 |
| JP | 2000004720 | A * | 1/2000 | A01K 85/00 |
| JP | 2003102338 | A * | 4/2003 | A01K 85/00 |
| JP | 2003265073 | A * | 9/2003 | A01K 85/00 |
| JP | 2004173657 | A * | 6/2004 | A01K 85/18 |
| JP | 2004357587 | A * | 12/2004 | A01K 85/00 |
| JP | 2005-137281 | | 6/2005 | |
| JP | 2005229824 | A * | 9/2005 | A01K 85/18 |
| JP | 2005341826 | A * | 12/2005 | A01K 85/00 |
| JP | 2006149328 | A * | 6/2006 | A01K 85/00 |
| JP | 2008182996 | A | 8/2008 | A01K 85/00 |
| JP | 2010193801 | A * | 9/2010 | A01K 85/18 |
| WO | WO 2004008847 | A1 * | 1/2004 | A01K 85/18 |

* cited by examiner

CRAWFISH FISHING LURE

BACKGROUND OF THE INVENTION

Field of the Invention

The present invention relates to a fishing lure.

Fishing lures are well known for use in catching fish. Fishing lures are typically attached to an end of a fishing line and designed to attract a fish to bite on a hook attached to the fishing lure. Fishing lures are designed to simulate or resemble a natural food source (e.g., a bait fish) for the fish both in appearance and in movement. The present invention provides improvements over the prior art fishing lures.

SUMMARY OF THE INVENTION

One aspect of the present invention is a fishing lure that includes a body resembling the shape of a crawfish, a flexible material, a wire material, a connection point, and a passage through the body. The body includes a plurality of interconnected body portions, where a trailing subset of the body portions includes a tail portion of the body. The flexible material is interconnected between the body portions of the tail portion to facilitate relative movement between the body portions of the tail portion. The relative movement between the body portions of the tail portion resembles a downward action of the tail of a crawfish. The wire material tends to resist the downward action of the body portions of the tail portion. The connection point is on a lower portion of the tail portion, and the passage is configured to receive a fishing line. The passage and the connection point are relatively positioned and arranged such that an upward pulling of the fishing line passing through the passage and connected to the connection point causes the relative movement of the body portions of the tail portion in the downward action. The wire material operates to return the body portions of the tail portion to their original position prior to the pulling. The upward pulling of the fishing line and resulting action of the tail portion tends to move the lure in a rearward direction when the lure is submerged in water.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF THE INVENTION

Figure 1:
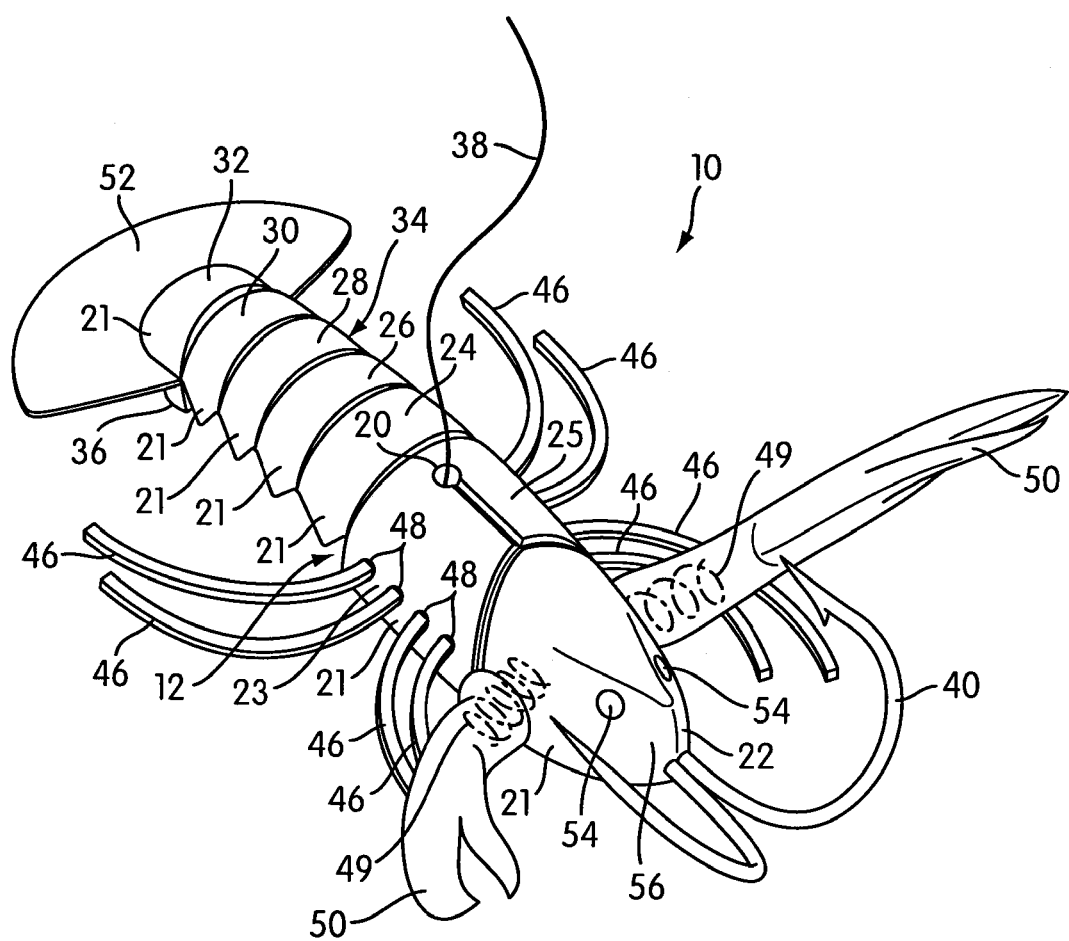
FIG. 1 shows a perspective view of a fishing lure in accordance with an embodiment of the present invention.
Figure 2:
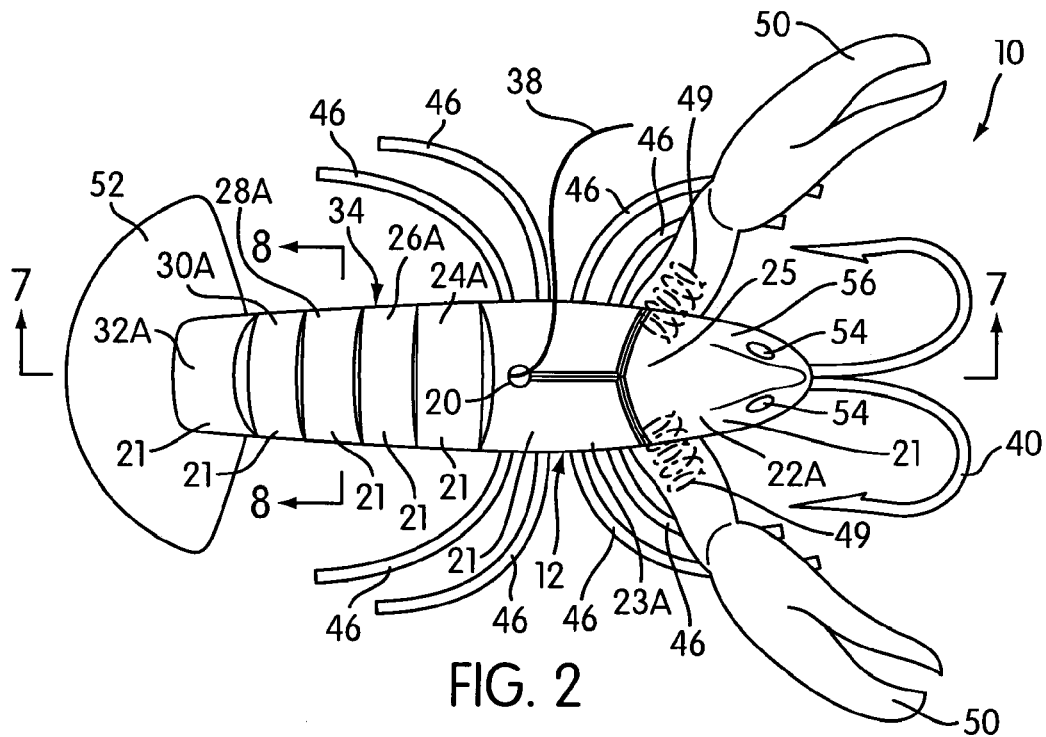
FIG. 2 shows a top view of the fishing lure in accordance with an embodiment of the present invention.
Figure 3:
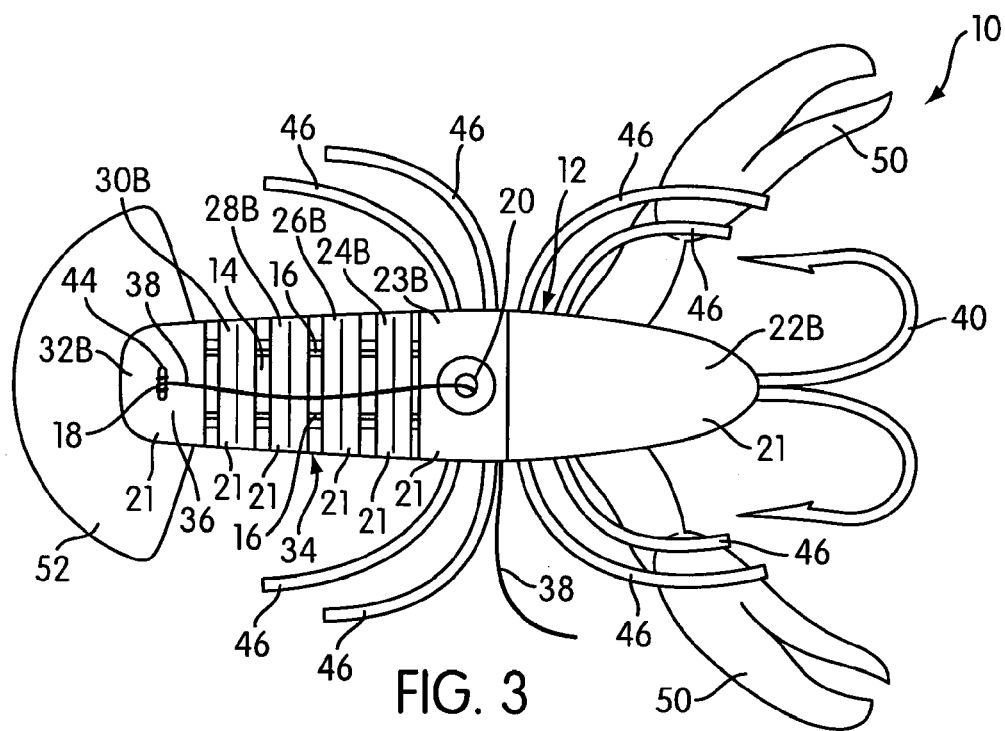
FIG. 3 shows a bottom view of the fishing lure in accordance with an embodiment of the present invention.

FIGS. 1, 2 and 3 show a fishing lure 10 in accordance with an embodiment of the invention. Specifically, FIGS. 1, 2 and 3 illustrate a perspective view, a top view and a bottom view of the fishing lure 10, respectively. The fishing lure 10 includes a body 12 resembling the shape of a crawfish, a flexible material 14 (as shown in FIG. 3), a wire material 16 (as shown in FIG. 3), a connection point 18 (as shown in FIG. 3), and a passage 20 through the body 12. The body 12 includes a plurality of interconnected body portions 21, where a trailing subset of the body portions 21 includes a tail portion 34 of the body 12. The flexible material 14 is interconnected between the body portions 21 of the tail portion 34 to facilitate relative movement between the body portions 21 of the tail portion 34. The relative movement between the body portions 21 of the tail portion 34 resembles a downward action of the tail of a crawfish. In one embodiment, the downward action comprises a curling motion. The wire material 16 tends to resist the downward action of the body portions 21 of the tail portion 34. The connection point 18 is on a lower portion 36 of the tail portion 34, and the passage 20 is configured to receive a fishing line 38.

Figure 4:
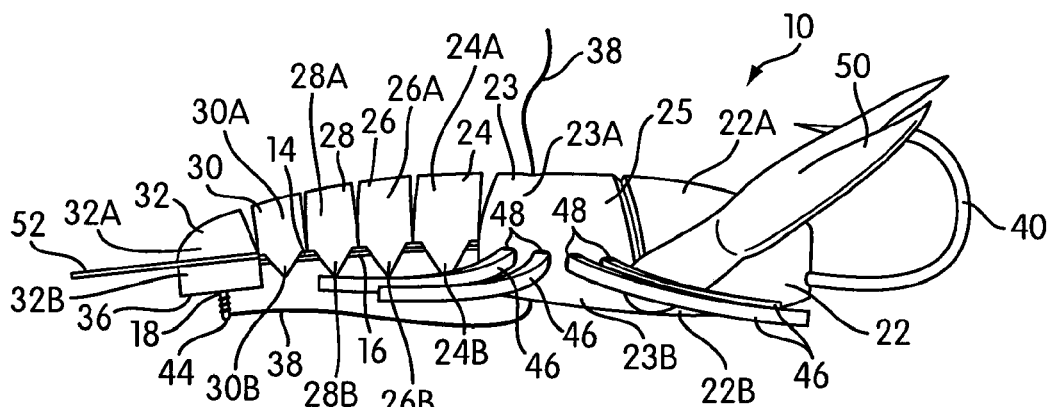
FIG. 4 shows a left side view of the fishing lure in accordance with an embodiment of the present invention.
Figure 6:
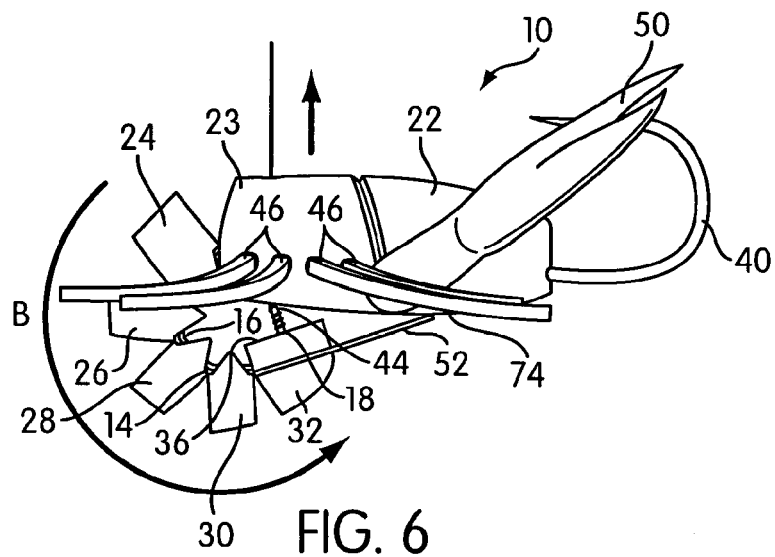
FIG. 6 shows yet another left side view of the fishing lure, wherein further pulling of fishing line causes the relative movement of the body portions of the tail portion in a downward action in accordance with an embodiment of the present invention.
Figure 9:
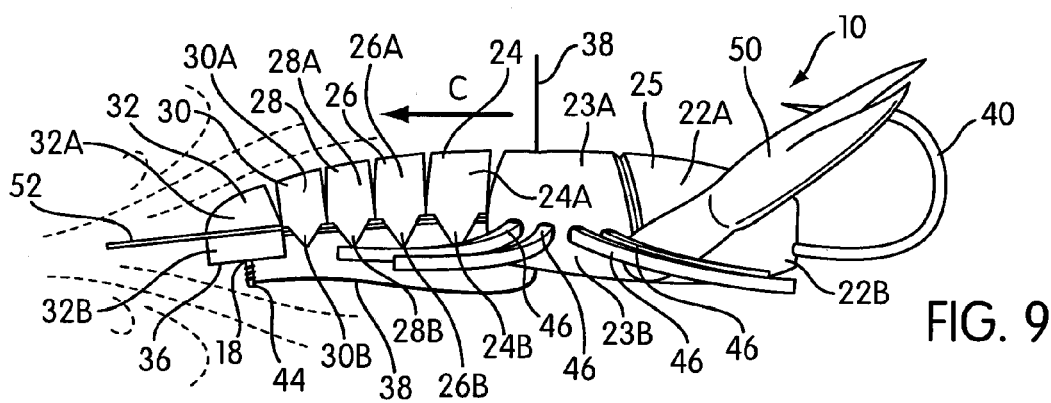
FIGS. 9-12 show left side views of the fishing lure describing the operation of the fishing lure in accordance with an embodiment of the present invention.
Figure 10:
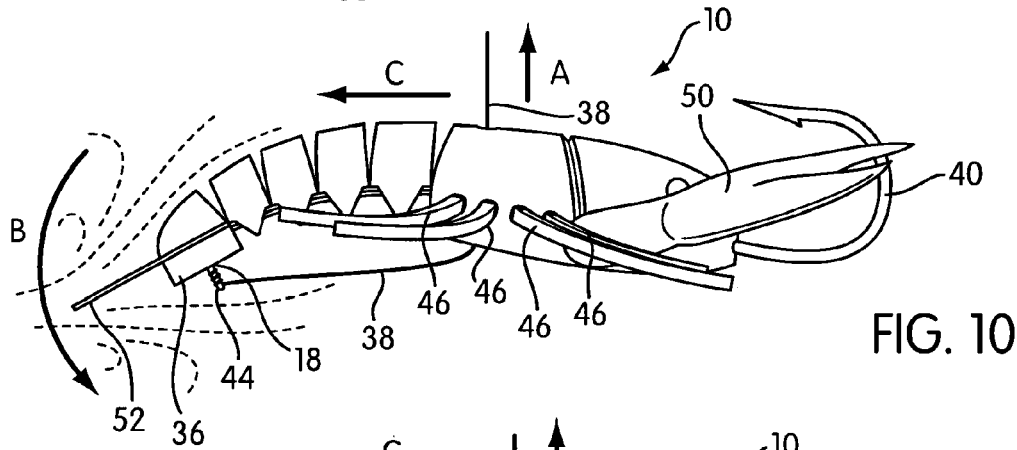
Figure 11:
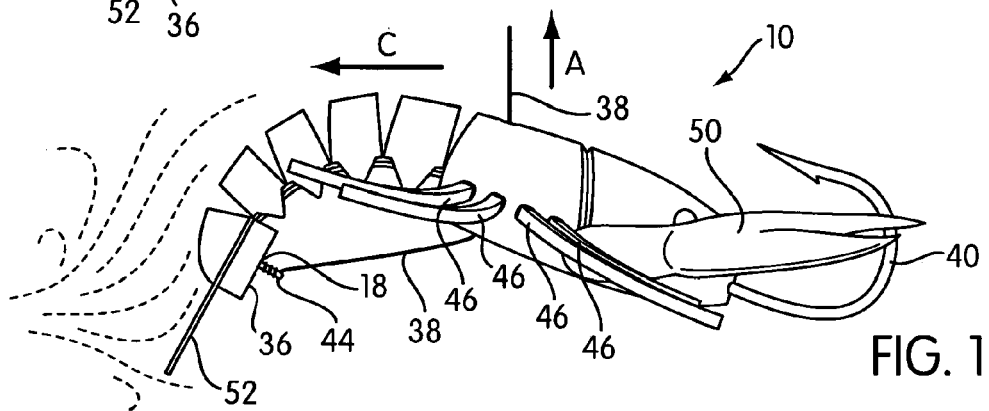
Figure 12:
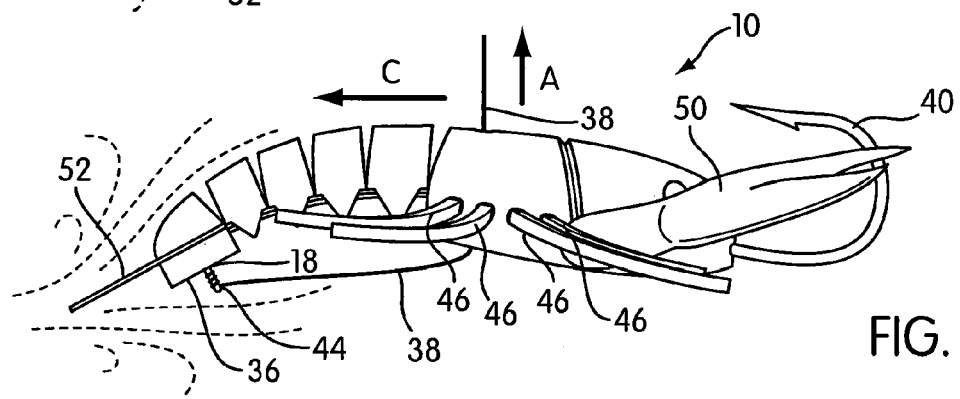

The passage 20 and the connection point 18 are relatively positioned and arranged such that an upward pulling of the fishing line 38 passing through the passage 20 and connected to the connection point 18 causes the relative movement of the body portions 21 of the tail portion 34 in the downward action (as shown by arrow B in FIG. 6). The wire material 16 operates to return the body portions 21 of the tail portion 34 to their original position prior to the pulling. In one embodiment, as shown in FIGS. 4 and 9, when in the original position, the body portions 21 of the tail portion 34 are generally configured in a straight or slightly curved orientation. The upward pulling of the fishing line 38 and resulting action of the tail portion 34 tends to move the fishing lure 10 in a rearward direction (as shown by an arrow C in FIGS. 9-12) when the fishing lure 10 is submerged in water.

In one embodiment, the body portions 21 are generally made from a rigid material. In one embodiment, the body portions 21 are made from a plastic material. In one embodiment, the plastic material that is used to form the body portions 21 may include a floatable plastic material. For example, such floatable plastic material may include a one to one ratio of micro bubbles to resin by volume. In another embodiment, the plastic material that is used to form the body portions 21 may include polycarbonate resin thermoplastic material (e.g., a Lexan® material supplied by SABIC Innovative Plastics). Alternatively, in another embodiment, the body portions 21 are made from a wood material. Yet in another embodiment, the body portions 21 are generally made from a semi-rigid material or a flexible material.

In one embodiment, the body portions 21 may include a head portion 22, a central portion 23, and the trailing subset of the body portions 21 forming the tail portion 34. In the illustrated embodiment, as just one example is shown in FIGS. 1-3, the trailing subset of the body portions 21 that form the tail portion 34 may include five body portions 24-32. However, the number of body portions 21 that form the tail portion 34 can vary significantly in number.

In one embodiment, the body portion 21 having the passage 20 therein is referred to as the central portion 23. In one embodiment, the head portion 22 and the central portion 23 are formed together as a unitary structure. In another embodiment, the head portion 22 and the central portion 23 are made of separate body portions. As shown in FIG. 4, the head portion 22 may include top head portion 22A and bottom head portion 22B and the central portion 23 may include top central portion 23A and bottom central portion 23B. In one embodiment, as shown in FIG. 4, the top head portion 22A and the top central portion 23A may form a unitary top body portion 25.

Figure 8:
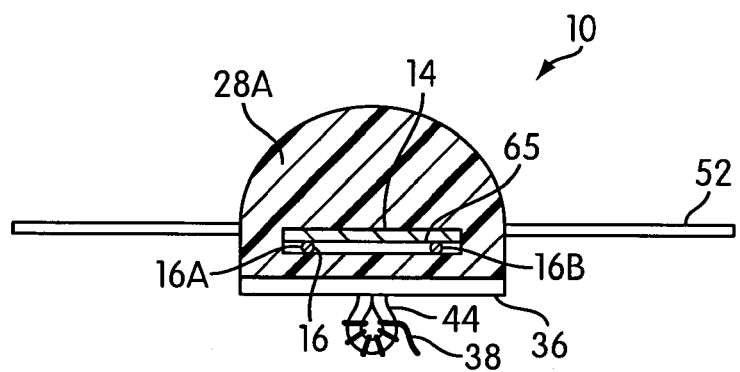
FIG. 8 is a cross-sectional view of the fishing lure taken through the line 8-8 axis of FIG. 2.

Each of the body portions forming the tail portion 34 includes opposing, body portions. For example, as shown in FIGS. 4 and 9, the body portions 24-32 forming the tail portion 34 include top body portions 24A, 26A, 28A, 30A, and 32A, and bottom body portions 24B, 26B, 28B, 30B, and 32B, respectively. In one embodiment, the top body portions 24A, 26A, 28A, 30A, and 32A may generally include a semi-circular cross-sectional configuration (when the cross-section of the fishing lure 10 is taken through a line along or parallel to 8-8 axis of FIG. 2). For example, as shown in FIG. 8, the top body portion 28A may generally include a semi-circular cross-sectional configuration when the cross-section of the fishing lure 10 is taken through the line 8-8 axis of FIG. 2.

Figure 7:
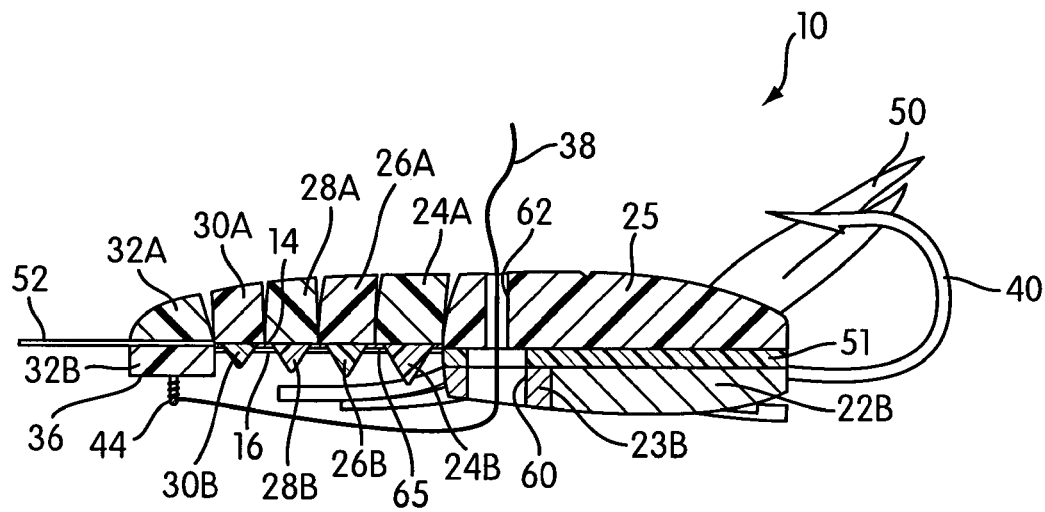
FIG. 7 is a cross-sectional view of the fishing lure taken through the line 7-7 axis of FIG. 2.

In one embodiment, as shown in FIG. 7, the bottom body portions 24B, 26B, 28B, 30B, and 32B generally include a triangular cross-sectional configuration when the cross-section of the fishing lure 10 is taken through the line 7-7 axis of FIG. 2. In the illustrated embodiment, as shown in FIG. 4, the bottom body portions 24B, 26B, 28B, 30B, and 32B resemble swimmerets (i.e., short appendages that are used for swimming) of the crawfish.

In one embodiment, the body portion 32B of the fishing lure 10 is weighted. The body portion 32B may be made from a metal material. In one embodiment, the body portion 32B is made from a brass material. In one embodiment, the weight of the body portion 32B is 2 grams.

In one embodiment, the body portions 22B and 23B of the fishing lure 10 are weighted. The body portions 22B and 23B are made from metal materials. In one embodiment, the body portion 22B is made from a lead material and the body portion 23B is made from a brass material. In one embodiment, the weights of the body portions 22B and 23B are 8.5 grams and 2.5 grams, respectively.

The weighted body portions 22B and 23B disposed in the forward portion of the fishing lure 10 and the weighted body portion 32B disposed in the rearward portion of the fishing lure 10 are constructed and arranged to provide a slightly curved orientation of the fishing lure 10, as shown in FIGS. 4 and 9, when the tension in the fishing line 38 is released (i.e., the fishing line 38 is not pulled through water).

In one embodiment, a hook 40 is attached to the head portion 22. In the illustrated embodiment, as shown in FIGS. 1-3, the hook 40 is a double hook (e.g., a round bend worm hook or a frog hook). In another embodiment, the hook 40 may include a single hook or a three pronged hook (or a treble hook). The hook 40 can be attached to the lure 10 by being slid into grooves or channels (not shown) formed in the head portion 22 and adhering them in place (e.g., via an adhesive). In another embodiment, the hook 40 is molded into the body portions 21 of the fishing lure 10. In one embodiment, the hook 40 is made from a 4/0 American Wire Gauge (AWG) wire.

The fishing lure 10 may include a pair of claws 50. In one embodiment, the claws 50 can be attached to the lure 10 by adhering them in place (e.g., via an adhesive). In another embodiment, the lure 10 may include grooves (not shown) that are configured to receive (coiled) wire portions 49 (e.g., made from a stainless steel material). In one embodiment, the diameter of the stainless steel wire that is used to form the coiled wire portions 49 is 0.021 inches. In one embodiment, the coiled wire portions 49 are shaped to pierce and penetrate into the claws 50 and hold them firmly in place. In one embodiment, the coiled wire portions 49 allow wiggling action or movement of the claws 50 as the fishing lure 10 is moved through water in a rearward direction.

In one embodiment, the claws 50 are made of a soft plastic material. In the illustrated embodiment, the claws 50, one on each side of the head portion 22, resemble chelipeds of the crawfish. The position and the number of the claws 50 on the fishing lure 10 can vary significantly.

The fishing lure 10 may include a plurality of legs 46. The legs 46 can be attached to the lure 10 by being slid into grooves 48 formed in the body portions 21 and adhering them in place (e.g., via an adhesive). In one embodiment, the legs 46 are made of a rubber material or an elastomeric material. In the illustrated embodiment, as shown in FIGS. 1-3, the fishing lure 10 has eight legs 46. In the illustrated embodiment, the legs 46, two on each side of the head portion 22 and two on each side of the central portion 23, resemble walking legs of the crawfish. The position and the number of the legs 46 on the fishing lure 10 can vary significantly.

In one embodiment, the claws 50 and the legs 46 are constructed and arranged to move (or wiggle) as the fishing lure 10 is moved through water in the rearward direction C (as shown in FIGS. 9-12).

The head portion 22 of the fishing lure 10 includes eyes 54, one on each side of the head portion 22, formed on outer surfaces 56 thereof.

The fishing lure 10 may include a tail fin 52. In one embodiment, the top body portion 32A and the bottom body portion 32B sandwich at least a portion of the tail fin 52 therebetween. The procedure in which the tail fin 52 is attached to the top body portion 32A and the bottom body portion 32B is discussed in detail below. In one embodiment, the tail fin 52 are made of a semi rigid plastic material. In one embodiment, the thickness of the semi rigid plastic tail fin 52 is 0.012 inches.

The attachment mechanism, such as tying the line 38 to the fishing line loop 44. In one embodiment, the fishing line 38 is secured directly to the fishing line loop 44. In another embodiment, the fishing line 38 is connected to the fishing line loop 44 by using a connector. In one embodiment, the fishing line hoop 44 may be made from a stainless steel material. In one embodiment, the diameter of the stainless steel wire that is used to form the fishing line hoop 44 is 0.021 inches.

The fishing lure 10 includes the passage 20 therethrough to enable the fishing line 38 to slidably pass through the passage 20 for connection with the connection point 18 (or the fishing line hook 44 disposed) on the lower portion 36 of the tail portion 34. In one embodiment, the passage 20 includes a generally cylindrical shaped configuration. In one embodiment, as shown in FIG. 7, the passage 20 include a lower portion 60 and an upper portion 62. In the illustrated embodiment, as shown in FIG. 7, a diameter of the lower portion 60 is greater than a diameter of the upper portion 62. In one embodiment, the diameter of the lower portion is 0.203 inches and the diameter of the upper portion 62 is 0.625 inches. Also, in the illustrated embodiment, as shown in FIG. 7, a height of the lower portion 60 is 0.16 inches and a height of the upper portion 62 is 0.235 inches.

In one embodiment, the flexible material 14 is formed from a polyester material. In another embodiment, the flexible material 14 is made from a nylon material. In one embodiment, the flexible material 14 is in the form of a nylon ribbon. In the illustrated embodiment, the flexible material 14 may include fabric strands, for example, polyester or nylon strands.

In one embodiment, the wire material 16 is formed from an alloy of nickel (Ni) and Titanium (Ti) materials. The alloy of nickel (Ni) and Titanium (Ti) materials is generally referred to Nitinol. Nitinol is generally known to exhibit shape memory and superelasticity (or pseudoelasticity) properties. These properties enable the wire material 16 to regain its original (initial) shape after the load applied to the wire material 16 (e.g., because of the upward pulling of the fishing line 38) is removed. When in the original shape the wire material 16 enables the body portions of the tail portion 34 to be generally in a straight or a slightly curved orientation as shown in FIGS. 4 and 9. In one embodiment, the diameter of the Nitinol wire that is used to form the wire material 16 is 0.012 inches.

A method of manufacturing the fishing lure 10 is described here. The method of manufacture begins by taking the flexible material 14 of a desired length and width. In one embodiment, the flexible material 14 is cut to a desired length and width. For example, the length of the flexible material 14 may be at least equal to or slightly more than the length of the tail portion 34 of the fishing lure 10. In such embodiment, when the flexible material 14 is cut to a desired length and width, binding is provided along the edges (e.g., cut edges) of the flexible material 14 to prevent tearing and fraying of the flexible material 14.

The next procedure in the method of manufacture of the fishing lure 10 is to adhere the wire material 16 to the flexible material 14. In one embodiment, the wire material 16 having identical length or at least substantially the same length as the flexible material 14 is taken and is adhered to a lower surface 65 (as shown in insert of FIG. 5 and in FIG. 8) of the flexible material 14. In one embodiment, the wire material 16 may include a pair of wire material portions 16A and 16B that are adhered, one on each side (i.e., right side and left side), on the lower surface 65 of the flexible material 14.

The next procedure in the method of manufacture of the fishing lure 10 is to join the unitary top body portion 25 and the bottom head portion 22B to each other. First, the hook 40 is received in channel or grooves formed in inner surfaces of the bottom head portion 22B. Similarly, the coiled wire portions 49 are received in channel or grooves formed in the inner surfaces of the bottom head portion 22B. Once the hook 40 and the coiled wire portions 49 are accommodated in their respective channels or grooves, the unitary top body portion 25 and the bottom head portion 22B are moved towards each other and adhered to each other (e.g., via an adhesive) thereby holding (sandwiching) the hook 40 and the coiled wire portion 49 in place. Also, the grooves 48 are formed on the inner surfaces of the unitary top body portion 25 and the bottom head portion 22B align such that when the unitary top body portion 25 and the bottom head portion 22B are adhered to each other the grooves 48 are constructed and arranged to receive the legs 46 (i.e., four front legs 46) therein.

Figure 13:
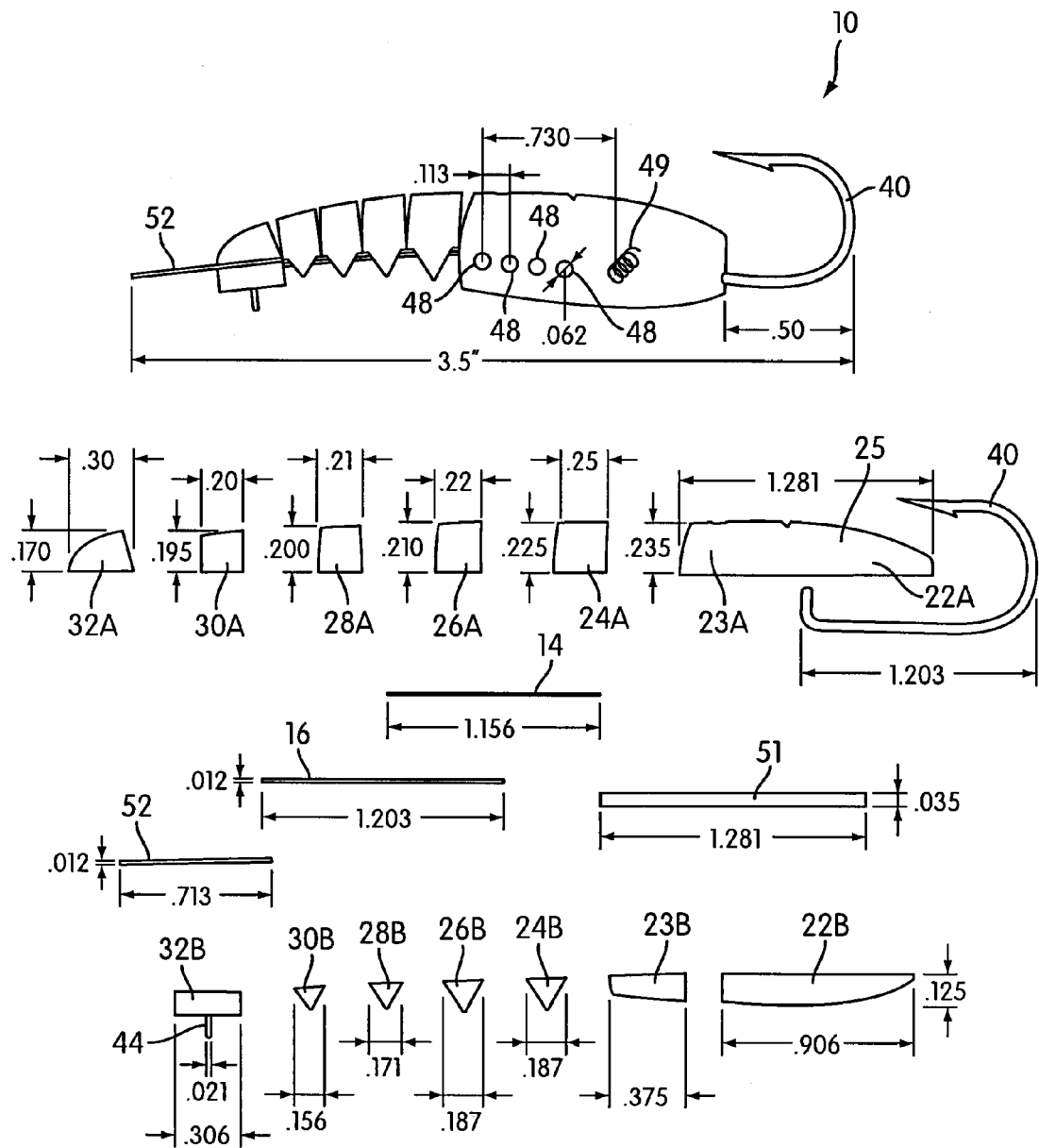
FIGS. 13 and 14 show portions and dimensions of various parts of an exemplary fishing lure in accordance with an embodiment of the present invention.
Figure 14:
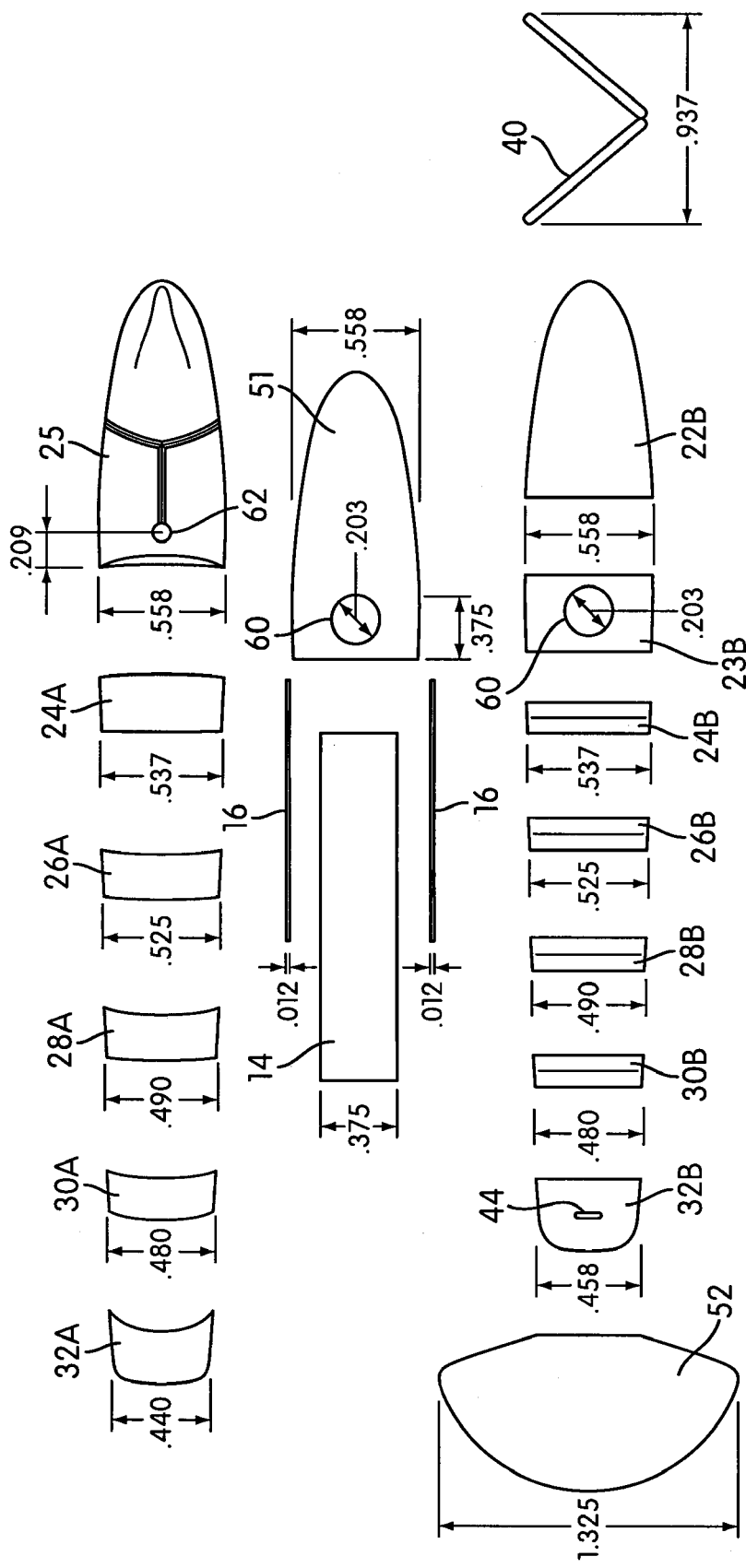

In one embodiment, a portion 51 (as shown in FIGS. 13 and 14) is placed between the unitary top body portion 25 and the bottom head portion 22B as the unitary top body portion 25 and the bottom head portion 22B are moved towards each other and adhered to each other (e.g., via an adhesive) thereby sandwiching the portion 51 therebetween. The portion 51 may be made from LEXAN® material. In one embodiment, the portion 51 enables the hooks 40 remain in place as the hooks 40 are being sandwiched between the unitary top body portion 25 and the bottom head portion 22B. In another embodiment, the fishing lure 10 may not include the portion 51. In such embodiment, the hooks 40 are first molded into the unitary top body portion 25 (when unitary top body portion 25 is formed by, for example, injection molding), and then the unitary top body portion 25 and the bottom head portion 22B (along with the hooks 40) adhered to each other (e.g., via an adhesive).

The next procedure in the method of manufacture of the fishing lure 10 is to join the unitary top body portion 25 (along with the bottom head portion 22B) and the bottom central portion 23B to each other and to the portion of the flexible material 14. The unitary top body portion 25 (along with the bottom head portion 22B) and the bottom central portion 23B are moved towards each other. As the unitary top body portion 25 (along with the bottom head portion 22B) and the bottom central portion 23B move towards each other, the unitary top body portion 25 (along with the bottom head portion 22B) and the bottom central portion 23B sandwich a portion of the flexible material 14 (with the wire material 16 adhered thereon) therebetween such that at least a portion of the unitary top body portion 25 and at least a portion of the bottom central portion 23B are adhered on opposite sides of the portion of the flexible material 14. The unitary top body portion 25 (along with the bottom head portion 22B) and the bottom central portion 23B are adhered to each other and to the portion of the flexible material 14 using an adhesive. The grooves 48 are formed on the inner surfaces of the unitary top body portion 25 and the bottom central portion 23B align such that when the unitary top body portion 25 and the bottom central portion 23B are adhered to each other the grooves 48 are constructed and arranged to receive the legs 46 (i.e., four back legs 46) therein. Also, when the unitary top body portion 25 (along with the bottom head portion 22B) and the bottom central portion 23B are adhered to each other, the upper and lower portions 62 and 60 (as shown in FIG. 7) of the passage 20 are aligned with each other to form the passage 20.

The next procedure in the method of manufacture of the fishing lure 10 is to join top and bottom body portions of the tail portion 34 to the flexible material 14 (with the wire material 16 adhered thereon) from opposite sides. The top body portions 24A, 26A, 28A, and 30A and the bottom body portions 24B, 26B, 28B, and 30B are adhered to the flexible material 14 (with the wire material 16 adhered thereon) from opposite sides using an adhesive.

The top body portion 32A and the bottom body portion 32B are moved towards each other. As the top body portion 32A and the bottom body portion 32B move towards each other, the top body portion 32A and the bottom body portion 32B sandwich a portion of the flexible material 14 (with the wire material 16 adhered thereon) and a portion of the tail fin 52 therebetween such that at least a portion of the top body portion 32A and at least a portion of the bottom body portion 32B are adhered on opposite sides of the portion of the flexible material 14 and the portion of the tail fin 52. The top body portion 32A and the bottom body portion 32B are adhered to each other and to the portion of the flexible material 14 and to the portion of the tail fin 52 using an adhesive.

The next procedure in the method of manufacture of the fishing lure 10 is to apply color to the fishing lure 10. In one embodiment, the color coating is applied to the fishing lure 10 using air brushing technique. For example, an air brush (not shown) is used to apply color coating to the fishing lure 10. In one embodiment, a holographic pattern of the fish is transferred to and adhered to surface of the body portion 21 using hot stamping technique. In one embodiment, the hot stamping technique is performed prior to applying the color coating to the body portions 21. The colors or color combinations used during the color coating process allow the fishing lure 10 to resemble a crawfish and to help attract target species of fish (e.g., channel catfish, largemouth bass, pike and muskie).

The next procedure in the method of manufacture of the fishing lure 10 is to attach the claws 50 and legs 46 to the fishing lure 10.

The legs 46 are generally inserted into the grooves 48 are adhered within the grooves 48 using an adhesive. In one embodiment, the grooves 48 are formed between the unitary top body portion 25 and the bottom head portion 22B to receive the four front legs 46. In one embodiment, the grooves 48 are formed between the unitary top body portion 25 and the bottom central portion 23B to receive the four rear legs 46. In another embodiment, the legs 46 are attached to the outer surfaces 67 of the body portions 21 using an adhesive. In one embodiment, the legs 46 are attached to the side surfaces of the body portions 21 using an adhesive. It is to be understood that the location of the legs 46 is not limited to the locations described above, but may be attached at other locations on the body portions 21.

The claws 50 are generally pierced into the coiled wire (not shown) to hold them firmly in place.

Figure 5:
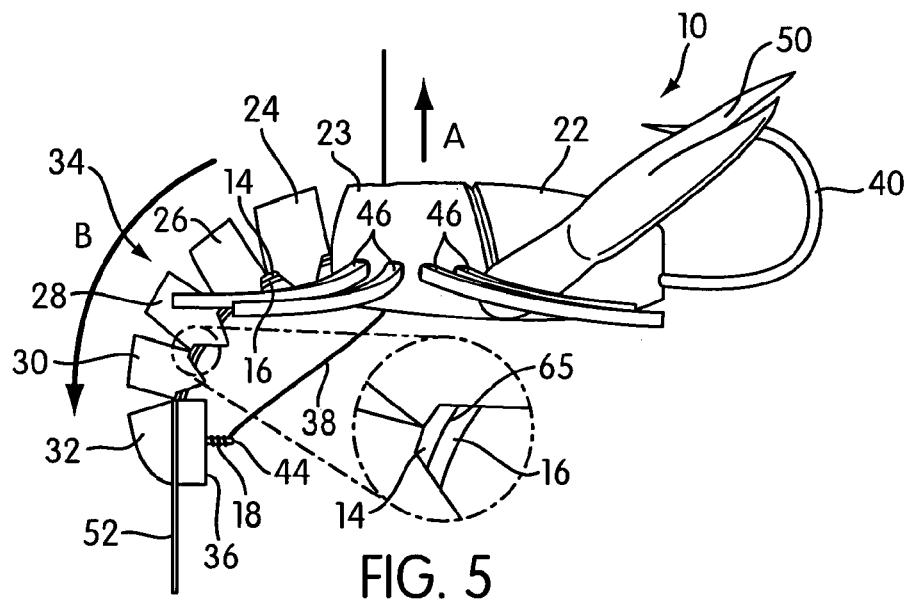
FIG. 5 shows another left side view of the fishing lure, wherein pulling of the fishing line causes a relative movement of body portions of a tail portion of the fishing lure in accordance with an embodiment of the present invention.

FIGS. 4-6 illustrate the relative movement of the body portions 21 of the tail portion 34 in a downward action. In one embodiment, the downward action comprises a curling motion. Specifically, FIG. 4 illustrates the fishing lure 10 in its original position (that is prior to the upward pulling of the fishing line 38). When in the original position, the body portions 21 of the tail portion 34 are generally configured in a straight (or slightly curved) orientation as shown in FIG. 4. As noted earlier, the weighted body portions 22B, 23B and 32B are constructed and arranged to provide the fishing lure with a slightly curved orientation. Alternatively, in another embodiment, the body portions 21 of the tail portion 34 are generally configured in a straight orientation when in the original position.

As shown in FIG. 5, the upward pulling (in the direction of an arrow A) of the fishing line 38 causes the relative movement of the body portions 21 of the tail portion 34 in the direction of an arrow B. In other words, when the fishing line 38 that is passing through the passage 20 and connected to the connection point 18 is pulled upwards (in the direction of the arrow A), first the body portions 32 (having the connection point 18) of the tail portion 34 and the flexible material 14 (and the tail fin 52) between the body portions 32 are pulled along with the fishing line 38. Since the body portions 24-32 of the tail portion 34 are interconnected to each other using the same flexible material 14, pulling of the flexible material 14 (between the body portions 32) causes the movement of the body portions 24-30 of the tail portion 34 along with it (in the direction of the arrow B).

As can be clearly seen in an insert in FIG. 5, the wire material 16 is attached to the flexible material 14 on the lower surface 65 of the flexible material 14. The wire material 16 tends to resist the downward curling action of the body portions 21 of the tail portion 34. In one embodiment, the upward pulling of the fishing line 38 (in the direction of the arrow A) causes the relative movement of the body portions 21 of the tail portion 34 in the downward curling action against the bias of the wire material 16. As will be clear from the discussions with respect to the FIGS. 9-12, the wire material 16 operates to return the body portions 24-32 to their original position (shown in FIGS. 4 and 9) when the tension in the fishing line 38 is released (i.e., the fishing line 38 is not pulled through water).

As the fishing line 38 is further pulled upward in the direction of the arrow A it causes further (relative) movement of the body portions 21 of the tail portion 34. This further movement of the body portions 24-32 of the tail portion 34 continues until the tail portion 34 of the fishing lure 10 is in a curled or a tucked position as shown in FIG. 6. In the tucked or curled position, the tail portion 34 of the fishing lure 10 is completely curled or tucked under the body of the fishing lure 10. In the tucked or curled position, the tail fin 52 engages with a lower surface 74 of the body portion 22B, which acts as a stop to prevent any further movement of the body portions of the tail portion 34. The relative movement of the body portions 21 of the tail portion 34 resembles a downward action of the tail of a crawfish.

The operation of the fishing lure 10 is described in detail with respect to FIGS. 9-12. The fishing line 38 of the fishing lure 10 is typically connected to a fishing rod and a reel (not shown). The fishing lure 10 is then cast into areas of water where target species of fish (e.g., channel catfish, largemouth bass, pike and muskie) may be found. The fishing lure 10 may be skillfully moved in the areas of water to attract target species of fish, and to encourage the target species of fish to bite the fishing lure 10.

FIG. 9 illustrates the fishing lure 10 in its original position (that is prior to the pulling of the fishing line 38). As noted above, when in the original position, the body portions 21 of the tail portion 34 are generally configured in a straight orientation or a slightly curved orientation.

The upward pulling of the fishing line 38 (that is passing through the passage 20 and connected to the connection point 18) in the direction of the arrow A causes the body portions 32 of the tail portion 34 and the flexible material 14 (and the tail fin 52) between the body portions 32 to be pulled along with the fishing line 38. Since the body portions 24-32 of the tail portion 34 are interconnected to each other using the same flexible material 14, pulling of the flexible material 14 (between the body portions 32) causes the movement of the body portions 24-30 of the tail portion 34 in the direction of the arrow B.

As noted above, the wire material 16, which is attached to the flexible material 14 on the lower surface 65 of the flexible material 14, tends to resist the downward action of the body portions 21 of the tail portion 34. When the tension in the fishing line 38 is released (i.e., the fishing line 38 is not pulled through water), the wire material 16 then operates to return the body portions 24-32 to their original position.

When the lure 10 is submerged in water, the orientation and the position of the passage 20 and the connection point 18 is such that upward pulling of the fishing line 38 and resulting action of the tail portion 34 tends to move the lure in a rearward direction (as shown by an arrow C). The pulling and releasing of the fishing line 38 causes rapid back and forth movements (i.e., the position shown in FIGS. 10 and 11 and the position shown in FIG. 9) of the tail portion 34. In other words, the pulling and releasing of the fishing line 38 causes the tail portion 34 to move from the position shown in FIG. 9 to the position shown in FIGS. 10 and 11, and from the position shown in FIGS. 10 and 11 to the position shown in FIG. 12. As shown in FIGS. 9-12, the resulting action of the tail portion 34 (i.e., caused by the pulling and releasing of the fishing line 38) causes the tail portion 34 and the tail fin 52 to act as a paddle to move the lure 10 in the rearward direction C. In one embodiment, the tail fin 52 acts as a paddle blade to push against the water to move the lure in the rearward direction C.

Also, the rapid back and forth movements of the tail portion 34 (caused by the pulling and releasing of the fishing line 38) causes the claws 50 and the legs 46 of the fishing lure 10 to move (or wiggle) as the fishing lure 10 is moved rearward through water in the direction C. This action of the tail portion 34, the claws 50 and the legs 46 of the fishing lure 10 simulates an actual crawfish swimming backwards (i.e., in the rearward direction C) in water to catch the attention of the target species of fish.

FIGS. 13-14 show portions and dimensions of various parts of an exemplary fishing lure in accordance with an embodiment of the present invention. The portions and dimensions of various parts of the exemplary fishing lure shown in FIGS. 13-14 are intended to be merely exemplary and not limiting in any way. The various parts of the exemplary fishing lure shown in FIGS. 13-14 are drawn to scale in accordance with one embodiment, although other scales and shapes may be used in other embodiments. The dimensions of various parts of the exemplary fishing lure as shown in FIGS. 13-14 are measured in inches unless indicated otherwise. In one embodiment, the dimensions of various parts of the exemplary fishing lure, as shown in FIGS. 13-14, are up to 10 percent greater than or up to 10 percent less than those illustrated.

In one embodiment, the length of the fishing lure generally ranges between 3 and 4 inches, when measured from an end of the hook 40 to an end of the tail fin 52. In one embodiment, the weight of the fishing lure 10 generally ranges between 21 to 28 grams. One skilled in the art will understand that the embodiment of the fishing lure 10, which resembles a crawfish, shown in the figures and described above is exemplary only and not intended to be limiting. It is within the scope of the invention to provide a fishing lure, which is having the shape of a shrimp or other similar crustaceans, with any or all of the features of the present invention. For example, the flexible tail portion constructed according to the principles of the present invention can be applied to any other fishing lure, for example, having the shape of a crustacean.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A fishing lure comprising:
    a body resembling a shape of a crawfish, the crawfish-shaped body comprising a plurality of interconnected body portions, a trailing subset of the body portions comprising a tail portion of the body, the crawfish-shaped body having a top side and an under side;
    a flexible material interconnected between the body portions of the tail portion to facilitate relative movement between the body portions of the tail portion, the relative movement resembling a downward action of the tail of a crawfish;
    a resilient wire material tending to resist the downward action of the body portions of the tail portion;
    a connection point on a lower portion of the tail portion;
    a passage extending generally vertically through the crawfish-shaped body, from the top side to the under side, the passage disposed in a central portion of the craw-fish shaped body, and the passage receiving a fishing line; and
    at least one hook attached to a forward portion of the crawfish-shaped body, the hook extending above an upper surface on the top side of the craw-fish shaped body;
    wherein the passage and the connection point being relatively positioned and arranged such that an upward movement of the fishing line passing through the generally vertical passage and connected to the connection point causes the relative movement of the body portions of the tail portion in the downward action, and wherein the wire material operates to return the body portions of the tail portion to an original position of the body portions of the tail portion prior to the upward movement,
    wherein the passage and the connection point are constructed and arranged such that the upward movement of the fishing line through the generally vertical passage and resulting action of the tail portion tends to move the lure in an upward and a rearward direction when the lure is submerged in water,
    wherein each of the body portions forming the tail portion includes a top body portion and a bottom body portion, and
    wherein the top body portion and the bottom body portion of each of the body portions forming the tail portion are disposed on opposing sides of the flexible material such that the flexible material and the resilient wire material extend between the top body portion and the bottom body portion.

2. The fishing lure of claim 1, wherein in the original position the body portions of the tail portion are generally configured in a straight or slightly curved orientation.

3. The fishing lure of claim 1, wherein the passage is disposed on one or more of the plurality of the interconnected body portions that are closer to the tail portion.

4. The fishing lure of claim 1, wherein the passage enables the fishing line to slidably pass therethrough for connection with the connection point on the lower portion of the tail portion.

5. The fishing line of claim 1, wherein the connection point is in the form a fishing line loop, the fishing line loop is constructed and arranged to facilitate attachment of the fishing line to the lower portion of the tail portion.

6. The fishing lure of claim 1, further comprising legs and grooves formed on the body portions to accommodate the legs.

7. The fishing lure of claim 6, wherein the legs are constructed and arranged to slide into the grooves of the body portions and to attach with the body portion.

8. The fishing lure of claim 6, wherein the legs are made of a rubber material.

9. The fishing lure of claim 6, wherein the legs are made of an elastomeric material.

10. The fishing lure of claim 1, further comprising claws and wire portions attached to the body.

11. The fishing lure of claim 10, wherein the wire portions are constructed and arranged to pierce and penetrate into the claws and to hold them in place.

12. The fishing lure of claim 11, wherein the claws are made from a soft plastic material.

13. The fishing lure of claim 10, wherein the wire portions are made from a stainless steel material.

14. The fishing lure of claim 1, further comprising a tail fin at least partially disposed between trailing body portions of the tail portion.

15. The fishing lure of claim 14, wherein the tail fin is made from a semi rigid plastic material.

16. The fishing lure of claim 14, wherein the upward movement and releasing of the fishing line and resulting action of the tail portion causes the tail portion and the tail fin to act as a paddle to move the lure in the rearward direction.

17. The fishing lure of claim 14, wherein the upward movement and releasing of the fishing line and resulting action of the tail portion causes the tail fin to act as a paddle blade to push against the water to move the lure in the rearward direction.

18. The fishing lure of claim 1, wherein the body portions are made from a plastic material.

19. The fishing lure of claim 1, wherein the body portions are made from a wood material.

20. The fishing lure of claim 1, wherein the flexible material is made from a nylon material.

21. The fishing lure of claim 1, wherein the flexible material is formed from a polyester material.

22. The fishing lure of claim 1, wherein the wire material is formed from a nickel and titanium alloy material so as to enable the wire material to regain its original shape after the load applied to the wire material because of the upward movement of the fishing line being removed.

23. The fishing lure of claim 1, wherein the downward action comprises a curling motion.

24. The fishing lure of claim 23, wherein the curling motion of the tail portion continues until the tail portion is completely curled or tucked under the body of the fishing lure.

25. The fishing lure of claim 24, wherein, when the tail portion is in a curled or tucked position, a tail fin engages with a surface disposed at the forward portion and the underside of the crawfish-shaped body, and wherein lower surface acts as a stop to prevent any further movement of the tail portion.

26. The fishing lure of claim 1, wherein at least two body portions of the plurality of interconnected body portions that are disposed at the forward portion of the crawfish-shaped body are weighted to form forwardly weighted body portions and at least one body portion of the tail portion of the crawfish shaped body is weighted to form a rearwardly weighted body portion, and wherein the forwardly and rearwardly weighted body portions of the craw-fish shaped body are constructed and arranged to provide a slightly curved orientation of the fishing lure when the fishing line is not pulled through water.

27. The fishing lure of claim 1, wherein the top body portion of each of the body portions forming the tail portion has a semi-circular cross-sectional configuration.

28. The fishing lure of claim 27, wherein the bottom body portion of each of the body portions forming the tail portion has a triangular cross-sectional configuration so as to resemble swimmerets of the crawfish.

29. The fishing lure of claim 1, wherein a length of the flexible material is at least equal to or slightly more than a length of the tail portion of the fishing lure.

30. The fishing lure of claim 29, wherein the wire material has an identical length or at least the same length as the flexible material and the wire material is adhered to a lower surface of the flexible material.

31. The fishing lure of claim 30, wherein the wire material includes a pair of wire material portions that are adhered, one on each side on the lower surface of the flexible material.

* * * * *